United States Patent [19]

Ohzeki

[11] Patent Number: 4,625,241
[45] Date of Patent: Nov. 25, 1986

[54] TIMING CONTROL SIGNAL GENERATOR FOR TELETEXT SIGNAL WAVEFORM EQUALIZER

[75] Inventor: Kazuo Ohzeki, Tokyo, Japan

[73] Assignee: Kabushiki Kaisha Toshiba, Kawasaki, Japan

[21] Appl. No.: 701,515

[22] Filed: Feb. 14, 1985

[30] Foreign Application Priority Data

Feb. 16, 1984 [JP] Japan ................................ 59-25974

[51] Int. Cl.$^4$ ............................................. H04N 7/087
[52] U.S. Cl. ................................... 358/147; 358/148; 358/905; 333/18
[58] Field of Search ............... 358/141, 142, 146, 147, 358/148, 167, 37, 905; 333/18

[56] References Cited

U.S. PATENT DOCUMENTS 4,202,012  5/1980  Hirashima ........................... 358/147
4,303,895 12/1981  Ohnishi et al. ...................... 358/905

OTHER PUBLICATIONS

"A One-Chip Automatic Equalizer for Echo Reduction in Teletext", by Voorman et al, IEEE Transactions on Consumer Electronics, vol. CE-27, No. 3, Aug. '81, pp. 512-529.
Rolf Deubert, "Feature IC's for Digivision TV Sets", IEEE Trans. on Consumer Electronics, vol. CE-29, No. 3, Aug. 1983, pp. 237-241.
Elektronik, No. 26, Dec. 30, 1983, Munich; J. O. Voorman et al, "Integrierter Echokompensator fur Videotext", pp. 60-64.

Primary Examiner—James J. Groody
Assistant Examiner—Michael D. Parker
Attorney, Agent, or Firm—Oblon, Fisher, Spivak, McClelland & Maier

[57] ABSTRACT

A timing control signal generator used in a Teletext signal waveform equalizer to remove waveform distortions in a Teletext signal inserted into a horizontal scanning line for a vertical blanking interval of a television signal and arranged to generate timing control signals for controlling the operation of the waveform equalizer. The timing of each of the timing control signals, at which the level variation thereof occurs, is predetermined. To generate these timing control signals by a small scale circuit arrangement, a pair of counters and a pair of read only memories are used. The first counter is cleared by a field start signal and counts sample clock pulses synchronized with the Teletext signal. The first ROM stores information indicative of level changes of the timing control signals and is accessed by the first counter. The level change information read out from the first ROM is counted by the second counter. The second counter accesses the second ROM which stores level information of the timing control signals at the level change timing of at least one of the timing control signals. The level information of the timing control signals read out from the second ROM is held in a latch circuit, thereby producing the timing control signals.

3 Claims, 7 Drawing Figures

TIMING CONTROL SIGNAL GENERATOR FOR TELETEXT SIGNAL WAVEFORM EQUALIZER

BACKGROUND OF THE INVENTION

The present invention relates to a waveform equalizer for a Teletext signal and, more particularly, to an improvement in an operation timing control signal generator for use in this waveform equalizer.

Recently, in Europe, United States of America and Japan, Teletext services have been practiced, whereby textual and graphic information is inserted into television broadcast signals and this teletext signal is converted to a television signal in a TV receiver to be displayed on the screen. As shown in FIG. 1, the Teletext signal is inserted, in the form of a two-level signal and, subsequent to a color burst signal, into one or more horizontal scanning lines in the vertical blanking interval of the television signal. A data packet of the Teletext signal consists of a header and information data. According to the system in Japan, the data packet has 320 samples and the sampling clock rate is 5.73 mega samples/second.

Recently, picture ghost cancellers (waveform equalizer) have been put into practical use to remove ghost components (waveform distortion), which are caused due to multipath transmission, from a received television signal. Where the waveform distortion is caused in the television signal, due to the ghost components, it is also obviously caused in the Teletext signal.

In the case of picture ghost cancellers, the video signal has to be processed on a real-time basis to remove ghost components. For this purpose, the ghost canceller has to be designed so as to operate at high speed, which has lead them to be large in circuit scale and costly. It is economically disadvantageous to use such a picture ghost canceller to remove the ghost components from the Teletext signal having a frequency band narrower than the video signal. Further, since the above picture ghost cancellers cannot eliminate short-delay ghosts, they cannot be adapted for a Teletext signal equalizer without modification.

Since the Teletext signal is transmitted within the vertical blanking interval of the television signal, the real-time process is not always necessary to eliminate the waveform distortions. That is, the waveform equalizing process can be performed during a video signal interval (one field interval). This means that an equalizer which may be simple in arrangement and operate at low speed is enough for equalization of the waveform of the Teletext signal. An example of the waveform equalizer for the Teletext signal is disclosed in Japanese Laid-Open Patent Publication No. 56(1981)-166674.

In the Teletext waveform equalizer, various kinds of timing control signals are needed to determine the operation timings of circuits. Further, for the waveform equalizing process, about 90,000 shots of 5.73 MHz clock pulses are needed in one field interval (about 16 milliseconds). A low-speed microprocessor is not adapted for generating such high-speed timing signals. To generate such timing control signals, a conventional timing control signal generator mainly consists of TTL logic ICs including counters, flip-flops and the like. However, in this case, the number of elements constituting the counters increases, causing the circuit scale to be remarkably enlarged. Actually, about 300 general-purpose logic ICs are used.

SUMMARY OF THE INVENTION

It is an object of the present invention to provide an operation timing control signal generator for use in a Teletext waveform equalizer which is simple in construction and, therefore, is of low cost.

A timing control signal generator, according to the invention comprises a synchronous circuit means connected to receive a television signal for generating a field start signal indicative of the start of a vertical blanking interval and sample clock pulses which have a frequency equal to the sample clock rate of a Teletext signal and are phase-locked with samples of the Teletext signal; first and second counter means; and first and second read only memories (ROMs). A feature of the invention resides in storing in the ROMs information indicative of level changes of the timing control signals and level information of the timing control signals at the timings when the level changes occur. These ROMs are accessed by the first and second counters driven by the sample clock pulses. For reducing the capacity of the ROMs, according to another embodiment of the invention, the first ROM stores the respective level information of the timing control signals at respective level change timings of the timing control signals, while the second ROM stores information as to a time duration between each level change timing and the next level change timing of a predetermined timing control signal.

DETAILED DESCRIPTION OF THE PREFERRED EMBODIMENTS

Figure 1:
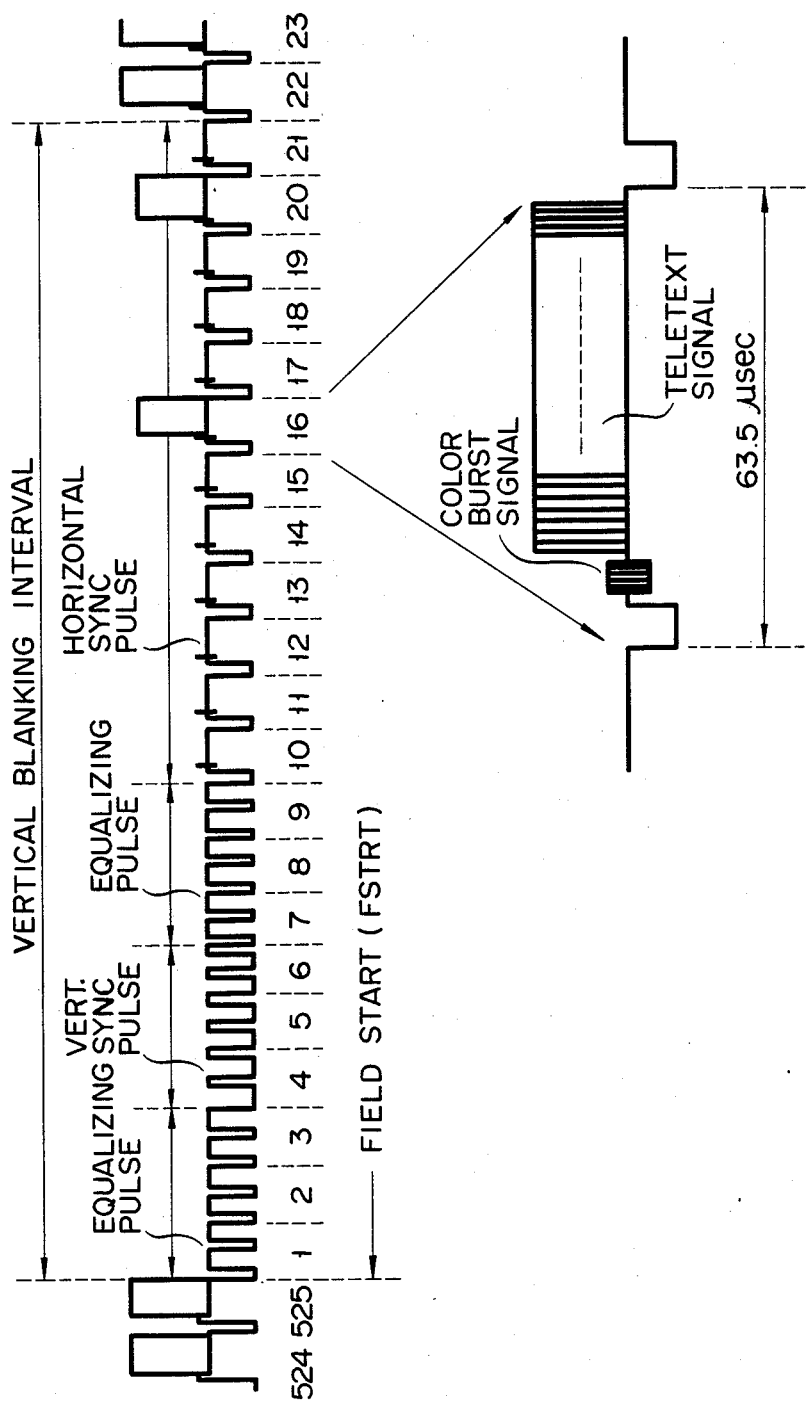
FIG. 1 is a waveform diagram of a television signal for explaining a Teletext signal.
Figure 2:
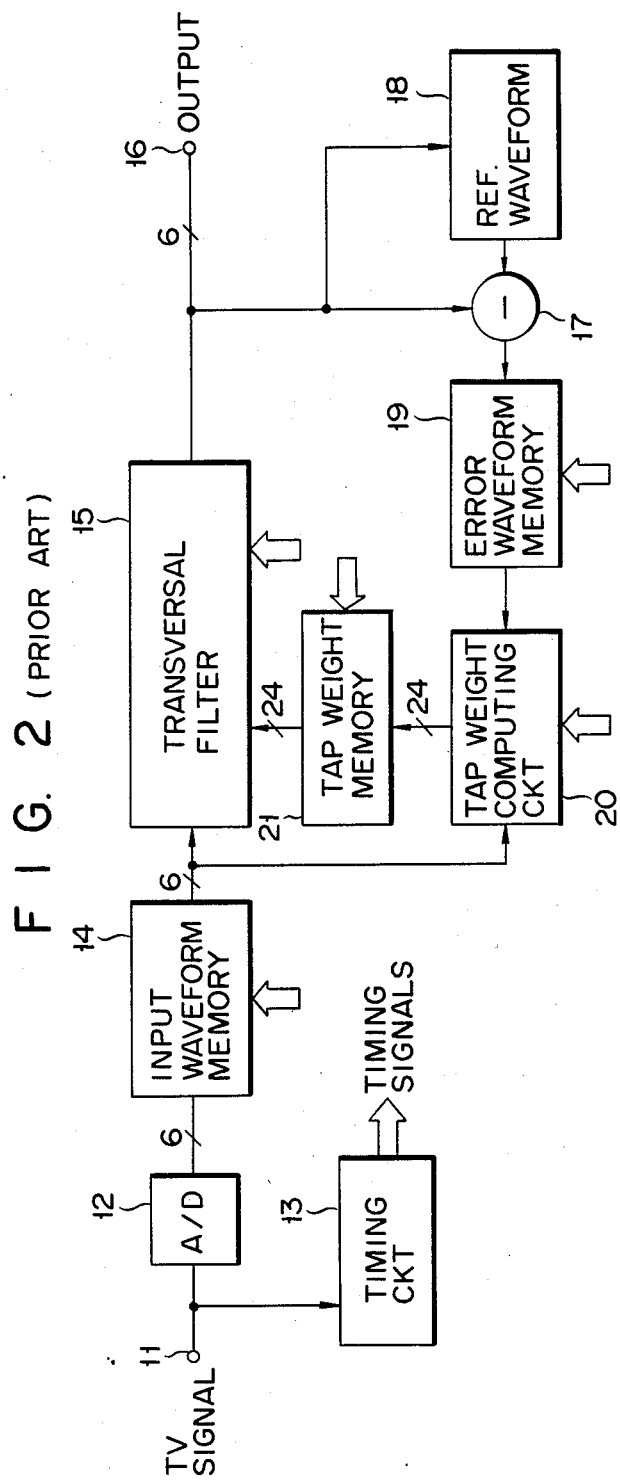
FIG. 2 is a schematic block diagram of a conventional Teletext signal waveform equalizer.
Figure 3:
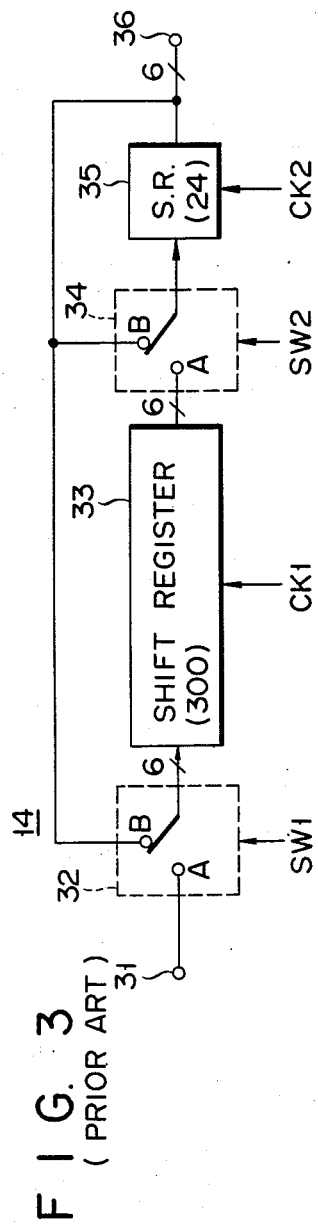
FIG. 3 is a block diagram of an input waveform memory in FIG. 2.

For easy understanding of the present invention, the Teletext signal waveform equalizer (ghost canceller) disclosed in the foregoing patent publication will now be described in detail with reference to FIGS. 2 and 3. A television signal demodulated by a demodulator (not shown) is applied through an input terminal 11 to an analog-to-digital (A/D) converter 12 and a timing signal generating circuit 13. The television signal is converted to a 6-bit digital form by the A/D converter 12. A digital output signal of the A/D converter 12 is applied to an input waveform memory 14, which extracts a Teletext signal in response to the timing signal generator 13 and stores the waveform of the Teletext signal in a digital form. The A/D converter 12 may be constituted so as to convert only the Teletext signal to a digital signal. The A/D converter 12 converts each sample of the two-level Teletext signal to six-bit digital data including a sign bit. As will be easily understood, in the case where the Teletext signal is subjected to waveform distortions due to ghost components, the amplitude of each sample varies depending upon the magnitude of ghost components.

The Teletext signal waveform read out from the input waveform memory 14 is applied to a transversal filter 15 for waveform equalization. An output signal of the transversal filter 15 is sent to a utilization circuit (not shown) through an output terminal 16, and to a subtracter 17 and a reference waveform generator 18. The reference waveform generator 18 examines the sign of a digital output signal of the transversal filter 15 and applies an output signal to the subtracter 17. The output signal of the reference waveform generator 18 is +1 when the sign is plus and −1 when it is minus. The subtracter 17 calculates the difference between the output signals of the transversal filter 15 and reference waveform generator 18, thereby producing data indicative of an error in the waveform. The error waveform data is stored in an error waveform memory 19.

The error waveform data from the error waveform memory 19 and the Teletext signal waveform from the input waveform memory 14 are applied to a tap weight computing circuit 20, which computes the correlation between the input waveform and the error waveform to obtain optimum tap weights of the transversal filter 15. The tap weights are stored in a tap weight memory 21, thereby applying tap weight data to the transversal filter 15. In this example, the number of taps of the transversal filter 15 is 24.

In the Teletext signal waveform equalizer, the error waveform computation, tap weight computation and convolution computation in the transversal filter 15 may be performed within one field interval of the television signal. The operation of the Teletext signal waveform equalizer is governed by a clock signal CK (5.73 MHz in the case of the Teletext system in Japan) and various kinds of timing control signals from the timing signal generator 13.

The operation of the waveform equalizer will now be described. It is assumed that the input waveform memory 14 is comprised of a shift register with 324 stages each connected to receive a word of 6-bits in parallel as shown in FIG. 3. The shift register is divided into a 300-stage shift register 33 and a 24-stage shift register 35. A switching circuit 32 is connected between an input terminal 31 and the shift register 35, while a switching circuit 34 is connected between the shift registers 33 and 35. Each of the electronic-type switching circuits 32 and 34 is of a single-pole double-throw type having stationary contacts A and B. The contacts A and B of the switching circuit 32 are connected to the input terminal 31 and the output of shift register 35, respectively. The contacts A and B of the switching circuits 34 are connected to outputs of the shift registers 33 and 35, respectively. The electronic switching circuits 32 and 34 are controlled by the operation of timing control signals SW1 and SW2 respectively, which are generated from the timing signal generator 13. Clock signals CK1 and CK2 of 5.73 MHz from the timing signal generator 13 are supplied to the shift registers 33 and 35, respectively, so that digital data is shifted right in the shift registers 33 and 35. The number of stages of the shift register 35 is equal to the number of taps of the transversal filter 15.

The operation of the input waveform memory 14 is shown in Table 1 below.

TABLE 1

| Mode | SW1 | SW2 | CK1 | CK2 | Number of times |
|---|---|---|---|---|---|
| Input | A | A | O | O | 324 |
| EW1- ① | B | B | X | O | 24 |
| - ② | B | A | O | O | 1 |
| EW2- ① | B | B | X | O | 24 |
| - ② | B | A | O | O | 1 |
| ⋮ | | | | | |
| EW48- ① | B | B | X | O | 24 |
| - ② | B | A | O | O | 1 |
| Rearrangement | B | A | O | O | 276 |

In this table, O denotes that the clock signal is supplied to the corresponding shift register and X means that no clock signal is supplied.

The timing signal generator 13 receives the TV signal to generate a field start signal FSTRT indicative of the start of a field, the sample clock signals CK, CK1 and CK2 phase-locked to the color burst signal, and various operation timing control signals including SW1 and SW2. The sample clock frequency (5.73 MHz) is set at 8/5 times the color burst signal frequency (3.58 MHz) of the NTSC color television system.

Figure 4:
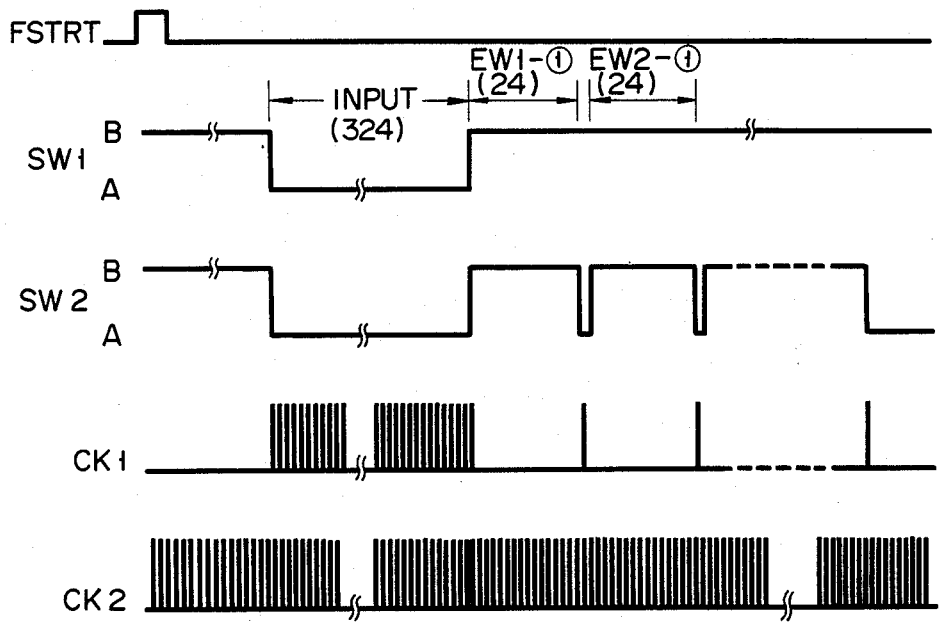
FIG. 4 is a signal waveform diagram for explaining the operation of the input waveform memory in FIG. 3.

The operation of the input memory 14 in FIG. 3 will now be described with reference to FIG. 4 and Table 1. The timing signal generator 13 detects a vertical blanking interval of a TV signal to generate the field start signal FSTRT. The switching circuits 32 and 34 are switched to the side B by the timing control signals SW1 and SW2, respectively. This occurs from the start of the field until the beginning of the Teletext signal, which allows the shift registers 33 and 35 to be disconnected from the A/D converter 12. When a Teletext signal is received, the switching circuits 32 and 34 are switched to the side A by the timing control signals SW1 and SW2, respectively, thereby permitting the digital Teletext signal to be loaded into the shift registers 33 and 35. During this interval, 324 clock signals CK1 and CK2 are applied to the shift registers 33 and 35 respectively, so that 324 samples of the Teletext signal are loaded into the shift registers 33 and 35 with 324 stages. Six bits of each sample are loaded into the shift register in parallel. The above-mentioned mode is the input mode shown in Table 1.

After the Teletext signal has been loaded, the switching circuits 32 and 34 are changed over to the side B by the control signals SW1 and SW2 and thereafter an error waveform operation mode EW is started. The error waveform operation is executed 48 times for every 24 samples. In a first error waveform operation interval EW1- ①, the clock pulse CK1 is not generated but 24 clock pulses CK2 are generated. Thus, the data in the shift register 35 recirculates while being loaded into the transversal filter 15. Thereafter, in the interval EW1- ②, the switching circuit 34 is switched to the side A, for only one clock pulse interval, by the switch control signal SW2 while the switching circuit 32 remains switched to the side B. Therefore, the shift registers 33 and 35 serve as a circulating shift register for the interval EW1- ② so that the data is shifted one stage right. The convolution is computed in accordance with the 24 sample data loaded in the transversal filter 15 and the tap weight coefficients from the tap weight memory 26. The result of the computation is applied to the subtracter 17 to produce an error waveform component which is stored in the error waveform memory 19. In this way, the data is read out 48 times on a 24-sample data unit basis from the input waveform memory 14, so that the convolution computation is executed 48 times and the data necessary for the gain computation for 24 taps of the transversal filter 15 is stored in the error waveform memory 19.

Thereafter, the rearrangement mode is executed to rearrange data in the shift registers 33 and 35 in the original input sequence. In this mode, the switching circuit 32 is switched to the side B and the switching circuit 34 is switched to the side A. 276 clock pulses CK1 and CK2 are applied to the shift registers 33 and 35, respectively, and 324 sample data are rearranged in the original input sequence. Thereafter, the processes of tap-weight computing in the tap weight computing circuit 20, writing the computed tap weight into the tap gain memory 21, and correcting the tap weights of the transversal filter 15 are executed.

An embodiment of the timing control signal generator, according to the invention, which is arranged to generate the operation timing control signals such as SW1 and SW2 will now be described with reference to FIG. 5. A video signal is applied, through an input terminal 40, to a synchronous circuit 41 which detects a vertical sync signal and extracts a color burst signal. Thus, the synchronous circuit 41 produces the field start signal FSTRT and the sample clock signal CK of 5.73 MHz. The field start signal FSTRT is applied to clear terminals of first and second counters 42 and 48, thereby initializing these counters every field. The sample clock signal CK is applied to the A/D converter 12 through a terminal 46 and to clock terminals of the counter 42 and a latch circuit 50.

The counter 42 is a binary counter having bit outputs which is responsive to the rising edge of the sample clock signal CK to vary output state in accordance with the binary system. Outputs of the counter 42 are coupled to address inputs of a first read only memory (ROM) 43. Binary data indicative of the changing points, occuring after the start of the field, of the operation timing control signals such as SW1 and SW2 has been stored in the ROM 43. Data of 1 is stored in addresses of the ROM 43 which correspond to times at which the level of at least one of the timing control signals including SW1 and SW2 changes after the start of the field, while data of 0 is stored in other addresses thereof. The addresses of the ROM 43 are designated by the counter 42 for measuring time from the start of the field on the basis of the sample clock signal CK. Therefore, data of 1 is read out from the ROM 43 whenever times, at which the level of the timing control signal should vary (these times have been predetermined), elapse with reference to the start time of the field.

An output signal of the ROM 43 is latched in a flip-flop 44 responsive to an inverted sample clock signal from an inverter 45, thereby driving the second counter 48. The counter 48 is a binary counter like the first counter 43, which counts 1 data outputs of the ROM 43, i.e., changing points of the timing control signal, thereby accessing a second ROM 49. The ROM 49 has, for instance, eight outputs corresponding to the number of necessary timing control signals for one address. ROM 49 stores, in each address thereof (corresponding to one changing point of the timing control signals) designated by counter 48, the level information (1 or 0) of each timing control signal at each changing point of the timing control signals. Consequently, eight data representative of the levels of eight timing control signals are read out from the ROM 49 at every changing point of the timing control signals.

Eight output data of the ROM 49 are latched into the latch circuit 50 responsive to the sample clock signal CK. Timing control signals T1 to T8 are taken from output terminals 47a to 47h of the latch circuit 50. For example, the control signals SW1 and SW2 as shown in FIG. 4 are taken from the output terminals T1 and T2. From an AND gate 51 to which the sample clock signal CK is applied and which is enabled by an inverted timing control signal SW2, is taken the clock signal CK1 to be applied to the shift register 33 of FIG. 3.

As described above, according to the present invention, due to the provision of two low-cost ROMs, the timing control signals for the Teletext signal waveform equalizer, which have little regularity and must vary at a speed of 5.73 MHz, can be generated on a relatively small circuit scale. According to the teaching of the present invention, the timing control signal generator may be sufficiently constituted by 10 to 20 general-purpose ICs. The circuit of the present invention can be easily integrated. If the timing control signal generator is realized by one ROM, the ROM necessitates a capacity of 90,000×8=720,000 bits to produce eight timing control signals. According to the embodiment of the present invention, two ROMs are used; therefore, the second ROM 49 may have a capacity of about 200 bits (the number of changing points of the timing control signals within a predetermined interval) per output, and thus the whole ROM capacity may be 90,000×1+256×8=92,000 bits.

Figure 6:
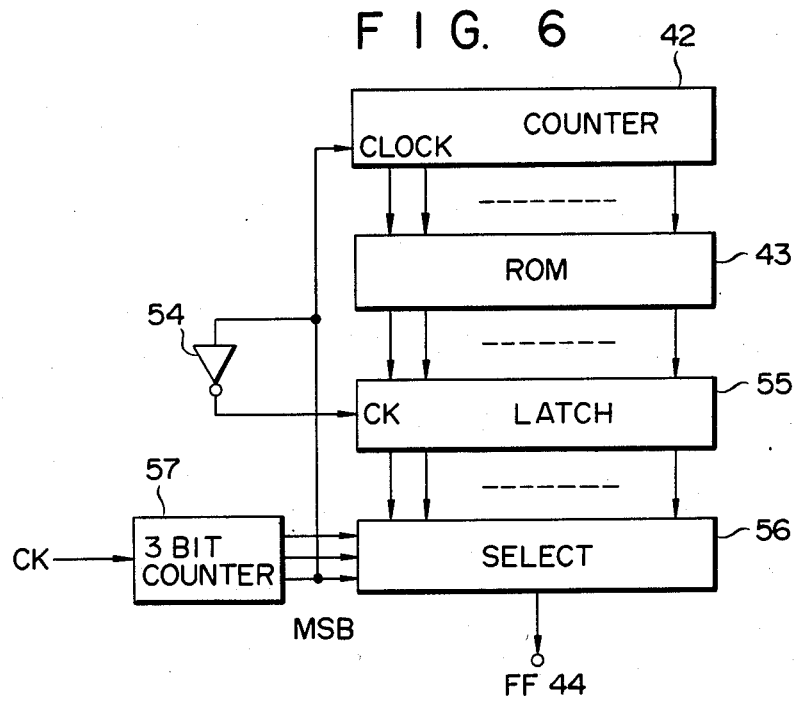
FIG. 6 shows a partially modified form of the timing control signal generator of FIG. 5.

Another embodiment of the present invention will now be described with reference to FIG. 6. In this embodiment, an eight-bit low-speed ROM is used as the first ROM. The sample clock signal CK is applied to a three-bit binary counter 57 so that its frequency is divided by 8. The MSB output of the counter 57 is applied to the clock input of the first counter 42. Outputs of the first counter 42 designate addresses of the first ROM 43. The MSB output of the counter 57 is inverted by an inverter 54 and then applied to a clock input of a latch circuit 55. Thus, the latch circuit 55 latches output data of the ROM 43 at the falling edge of the MSB output of the counter 57. Then, a selector 56 sequentially selects one of eight outputs of the ROM 43 in response to three-bit outputs of the counter 57 and sends it to the flip flop 44 in FIG. 5. Thereafter, various timing control signals are produced in a similar manner as in the case of FIG. 5.

Still another embodiment of the present invention will now be described with reference to FIG. 7.

Figure 7:
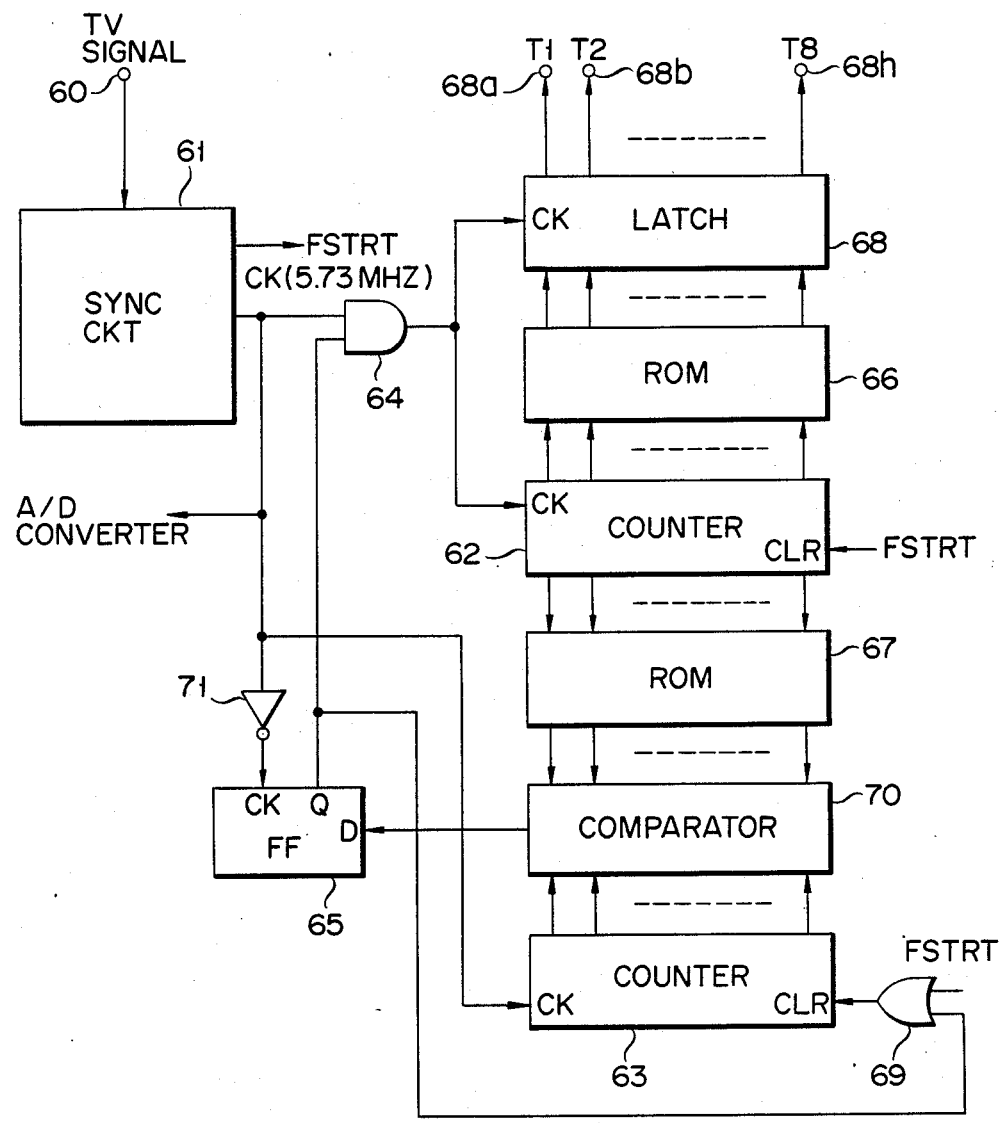
FIG. 7 is a block diagram of a timing control signal generator according to another embodiment of the invention.

In FIG. 7, a synchronous circuit 61 receives a video signal through an input terminal 60 to produce the field start signal FSTRT and sample clock signal CK. The field start signal FSTRT is applied to clear terminals of first and second counters 62 and 63. The sample clock signal CK is applied to a clock terminal of the counter 62 through an AND gate 64. The AND gate 64 is enabled by the Q output of a flip-flop 65. As will be described later, the AND gate 64 is enabled by the flip-flop 65 when at least one of the timing control signals changes. Therefore, the counter 62 counts one shot of sample clock signal CK when the level of at least one of the timing control signals changes after the counter 62 has been cleared by the field start signal FSTRT.

Outputs of the counter 62 are coupled to address inputs of first and second ROMs 66 and 67. Similarly to the ROM 49 in FIG. 5, the ROM 66 stores in each address the level data of 8 timing control signals at each change point thereof. The data read out from the ROM 66 is latched in a latch circuit 68 responsive to the sample clock CK from the AND gate 64. The latch circuit 68 holds data read out from the ROM 66 at the previous change point until the next change occurs in the timing control signals. Eight timing control signals are generated from eight outputs 68a to 68h of the latch circuit 68 in a similar manner as the foregoing embodiment.

The ROM 67 stores data as to the respective time durations of the 1-level intervals and 0-level intervals of one timing control signal, in other words, data as to time duration between adjacent change points of this timing control signal. The counter 63 is cleared through an OR gate 69 by the field start signal FSTRT or the Q output of the flip-flop 65. The counter 63 counts the sample clock signal CK to measure time running from a changing point of the timing control signal indicated by the Q output of the flip-flop 65. The outputs of the ROM 67 and counter 63 are compared by a comparator 70. When both outputs coincide, the comparator 70 sends a 1 output to the D input of the flip-flop 65. The inverted signal of the sample clock CK is applied through an inverter 71 to the clock terminal of the flip-flop 65. As a result, the flip-flop 65 holds the 1 output of the comparator 70 at the falling edge of the sample clock CK. Thus, the AND gate 64 is enabled to cause the counter 62 to count one sample clock CK, and at the same time the counter 63 is cleared, thereby allowing the measurement of time to be restarted. In this way, the timing control signals, necessary for the waveform equalization, are generated.

Figure 5:
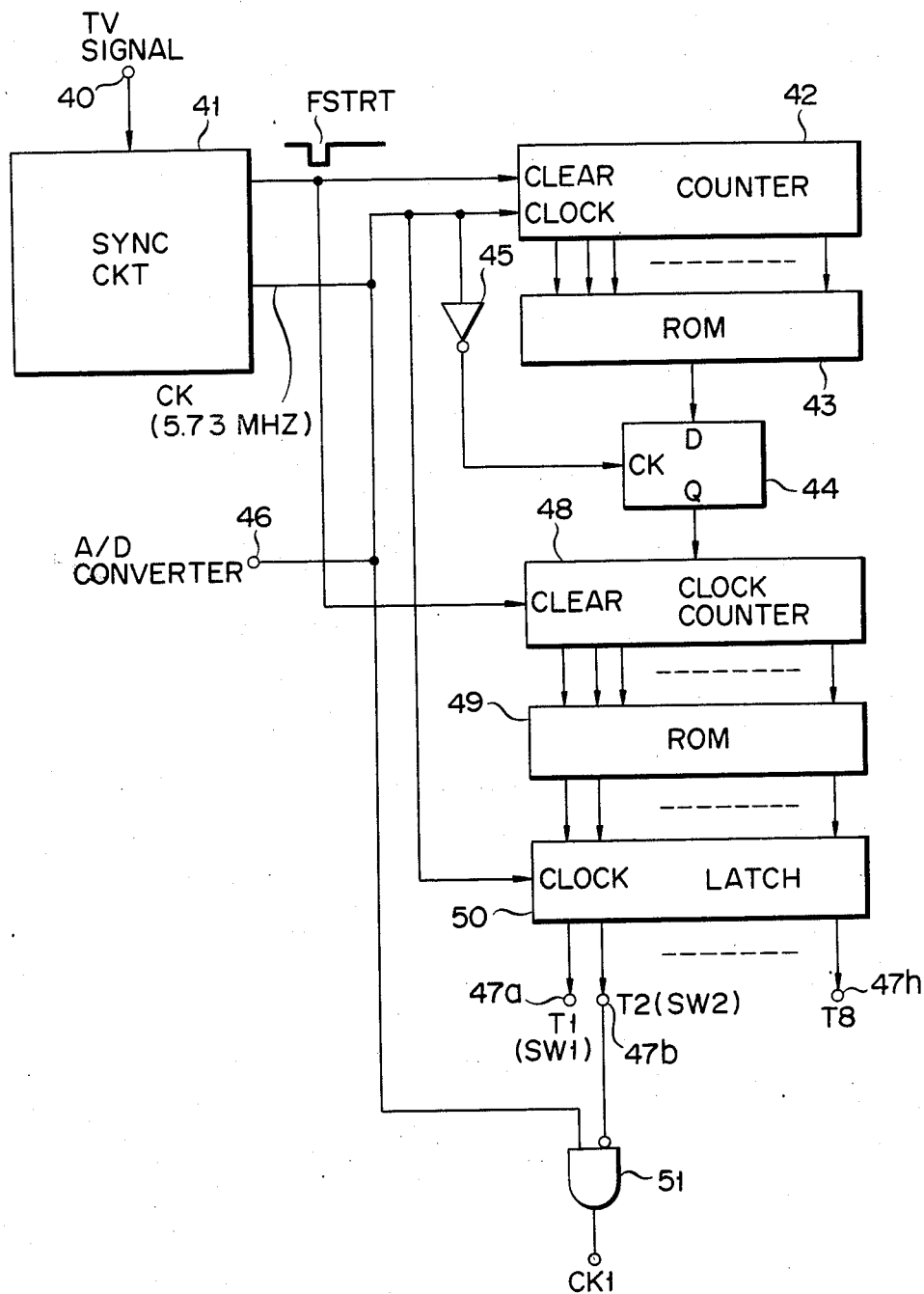
FIG. 5 is a block diagram of a timing control signal generator for a Teletext signal waveform equalizer according to one embodiment of the present invention.

In the embodiment of FIG. 7, capacities of ROMs may be smaller than those in the case of FIG. 5. The number of all change points of eight timing control signals is about 200, so that $256 \times 8 = 2,048$ bits are enough for the first ROM 66. If a time duration between change points of the timing control signal is expressed by eight bits, the second ROM 67 may have a capacity of $256 \times 8 = 2,048$ bits. Therefore, the whole capacity of ROMs is 4,096 bits.

What is claimed is:

1. A timing circuit used in a Teletext signal waveform equalizer to remove waveform distortions of a Teletext signal inserted into a horizontal scanning line during a vertical blanking interval of a television signal and arranged to generate timing control signals for controlling the operation of said waveform equalizer, timings when the level of each of said timing control signals varies running from the start of the vertical blanking interval being predetermined, comprising:
    synchronous circuit means connected to receive the television signal for generating a field start signal corresponding to the start of the vertical blanking interval and sample clock pulses having a frequency equal to a sample clock rate of the Teletext signal and phase-locked with samples of the Teletext signal;
    first counter means connected to said synchronous circuit means for counting the sample clock pulses, said first counter means being cleared by the field start signal;
    first read only memory means having address inputs coupled to outputs of said first counter means and having stored information as to each level changing point of said timing control signals, said read only memory means being accessed by said first counter means to read out the level changing point information from an address designated by said first counter means at a point of time when the level of at least one of said timing control signals changes after the field start signal has been generated;
    second counter means for counting the level change information read out from said first read only memory means, said second counter means being cleared by the field start signal;
    second read only memory means having address inputs coupled to outputs of said second counter means and having stored information as to levels of said timing control signals at each of the level change points of said timing control signals in an address corresponding to the level change point, said second read only memory means being accessed by said second counter means to read out, at a timing when at least one of the timing control signals changes, the level information of the timing control signals at said timing; and
    circuit means responsive to the sample clock pulses for holding the level information of the timing control signals read out from said second read only memory means until different level information is read out therefrom, thereby producing the timing control signals.

2. A timing circuit according to claim 1, further comprising:
    at least one logic circuit means for receiving one of the timing control signals from said circuit means and the sample clock pulses.

3. A timing circuit used in a Teletext signal waveform equalizer to remove waveform distortions of a Teletext signal inserted into a horizontal scanning line during a vertical blanking interval of a television signal and arranged to generate timing control signals for controlling the operation of said waveform equalizer, timings when the level of each of said timing control signals varies running from the start of the vertical blanking interval being predetermined, comprising:
    synchronous circuit means connected to receive the television signal for generating a field start signal corresponding to the start of the vertical blanking interval and sample clock pulses having a frequency equal to a sample clock rate of the Teletext signal and phase-locked with samples of the Teletext signal;
    first read only memory means having stored level information of the timing control signals at a timing when at least one of the timing control signals changes in an address corresponding to the change timing;
    second read only memory means having stored information as to time duration between a timing when the level of at least one of the timing control signals changes and the next timing when the level of at least one of the timing control signals changes in an address corresponding to the previous timing;
    first counter means for counting the sample clock pulses at every level change timing of the timing control signals, said counter means being adapted for accessing said first and second read only memory means to read out respectively therefrom the level information of the timing control signals and the time duration information between the level change timings of the timing control signals;

second counter means for counting the sample clock pulses, said second counter being cleared by the field start signal;

comparator means for comparing the time duration information read out from said second read only memory means with a count value of said second counter means;

circuit means responsive to said comparator means for supplying one sample clock pulse to said first counter means at every level change timing of the timing control signals and clearing said second counter means when the time duration information coincides with the count value; and latch means for holding the level information of the timing control signals read out from said first read only memory means in response to said one sample clock pulse from said circuit means until different level information is read out therefrom, thereby producing the timing control signals.

* * * * *